US012451237B2

(12) United States Patent
Linares et al.

(10) Patent No.: US 12,451,237 B2
(45) Date of Patent: Oct. 21, 2025

(54) INTEGRATED PATIENT ACQUISITION FOR VIRTUAL CARE

(71) Applicant: Change Healthcare Holdings, LLC, Nashville, TN (US)

(72) Inventors: Serrah Lynn Linares, Gig Harbor, WA (US); Gautam Shah, San Francisco, CA (US)

(73) Assignee: Change Healthcare Holdings, LLC, Nashville, TN (US)

( * ) Notice: Subject to any disclaimer, the term of this patent is extended or adjusted under 35 U.S.C. 154(b) by 319 days.

(21) Appl. No.: 17/354,309

(22) Filed: Jun. 22, 2021

(65) Prior Publication Data

US 2022/0406441 A1 Dec. 22, 2022

(51) Int. Cl.
*G16H 40/20* (2018.01)
*G06N 20/00* (2019.01)
*G16H 10/60* (2018.01)
*G16H 40/67* (2018.01)
*G06Q 10/1093* (2023.01)
*G16H 10/20* (2018.01)

(52) U.S. Cl.
CPC ............. *G16H 40/20* (2018.01); *G06N 20/00* (2019.01); *G16H 10/60* (2018.01); *G16H 40/67* (2018.01); *G06Q 10/1095* (2013.01); *G16H 10/20* (2018.01)

(58) Field of Classification Search
CPC ........ G16H 40/20; G16H 40/67; G16H 10/60; G16H 10/20; G16H 50/20; G06N 20/00; G06Q 10/1095
See application file for complete search history.

(56) References Cited

U.S. PATENT DOCUMENTS 9,886,547 B2 * 2/2018 Baniameri .............. G16Z 99/00
11,195,617 B1 * 12/2021 Singh ..................... G16H 50/70
(Continued)

OTHER PUBLICATIONS

Li, Weizi. Integrated clinical pathway management for medical quality improvement—based on a semiotically inspired sustems architecture. European Journal of Information Systems. 2014. (Year: 2014).*

(Continued)

*Primary Examiner* — Christopher L Gilligan
*Assistant Examiner* — Tristan Isaac Evans
(74) *Attorney, Agent, or Firm* — MARSHALL, GERSTEIN & BORUN LLP (57) ABSTRACT

In an embodiment, a method of interacting with a patient via a virtual triage system and for determining a suggested care path is provided. The method includes: receiving an input communication from a patient via a user interface in communication with the virtual triage system, the virtual triage system including a stored engagement model; parsing the input communication using the stored engagement model to derive a meaning from the input communication; gathering information from the patient via the user interface, the information related to the derived meaning of the input communication; accessing health data associated with the patient; generating a suggested care path using a stored care model based on the gathered information and the health data; and outputting the suggested care path to the patient via the user interface.

17 Claims, 6 Drawing Sheets

(56) References Cited

U.S. PATENT DOCUMENTS

| | | | |
|---|---|---|---|
| 11,786,735 B1* | 10/2023 | Heldman | G16H 50/30 |
| | | | 705/2 |
| 2009/0018882 A1* | 1/2009 | Burton | G06Q 10/0633 |
| | | | 705/7.27 |
| 2014/0297318 A1* | 10/2014 | Prasad | G06Q 10/1095 |
| | | | 705/3 |
| 2016/0328519 A1* | 11/2016 | Cox | G16H 40/20 |
| 2017/0318152 A1* | 11/2017 | Chen | H04M 3/42068 |
| | | | 709/227 |
| 2018/0121808 A1* | 5/2018 | Ramakrishna | H04L 51/02 |
| 2018/0218126 A1* | 8/2018 | Salazar | G16H 50/30 |
| 2019/0311814 A1* | 10/2019 | Kannan | G16H 10/60 |
| 2020/0066383 A1* | 2/2020 | Rutledge | G16H 80/00 |
| 2020/0097814 A1* | 3/2020 | Devesa | G10L 15/1815 |
| 2021/0134444 A1* | 5/2021 | Redlus | G16H 50/30 |
| 2022/0247699 A1* | 8/2022 | Gupta | H04L 51/02 |

OTHER PUBLICATIONS

Sterling. Prediction of Emergency Department Patient Disposition Based on Natural Language Processing of Triage Notes. International Journal of Medical Informatics 129 (2019) 184-188. (Year: 2019).*

Suta. An Overview of Machine Learning in Chatbots. International Journal of Mechanical Engineering and Robotics Research vol. 9, No. 4, Apr. 2020. (Year: 2020).*

Ayanouz. A Smart Chatbot Architecture Based NLP and Machine Learning for Health Care Assistance. NISS '20: Proceedings of the 3rd International Conference on Networking, Information Systems & Security. Article No. 78, pp. 1-6. https://doi.org/10.1145/3386723.3387897. May 18, 2020. (Year: 2020).*

\* cited by examiner

INTEGRATED PATIENT ACQUISITION FOR VIRTUAL CARE

BACKGROUND

At present, the healthcare environment suffers from several deficiencies that make it difficult for patients to access care. For example, there is a shortage of primary care physicians, skilled nursing staff, and other trained professionals needed to enable primary care modalities. There is also reduced access to primary and emergent care as a result of this shortage. Public health events, such as the COVID-19 pandemic stress the healthcare systems as potentially ill people overwhelm it. Also, there is a growing population of older patients with one or more chronic diseases that need on-going care that are impacted by the present state of healthcare.

In such an environment as described above and most notably in a public health emergency, healthcare providers need the ability to remotely triage and guide potential patients to the appropriate modality of care in a manner that: (1) prevents overutilization of triage services, e.g., visits to the emergency department; (2) guides potential patients to clinically appropriate modalities of care, e.g., in-person visit or remote care visit; and (3) fulfills the operational and financial workflows required to confirm the care encounter.

SUMMARY

In an embodiment a system for determining a suggested care path for a patient is provided. The system includes at least one computing device and a computer-readable medium. The computer-readable medium storing computer-executable instructions that when executed by the at least one computing device cause the at least one computing device to: receive an input communication from a patient via a user interface in communication with the virtual triage system, the virtual triage system including a stored engagement model; parse the input communication using the stored engagement model to derive a meaning from the input communication; gather information from the patient via the user interface, the information related to the derived meaning of the input communication; access health data associated with the patient; generate a suggested care path using a stored care model based on the gathered information and the health data; and output the suggested care path to the patient via the user interface.

In an embodiment, a method of interacting with a patient via a virtual triage system and for determining a suggested care path is provided. The method includes: receiving an input communication from a patient via a user interface in communication with the virtual triage system, the virtual triage system including a stored engagement model; parsing the input communication using the stored engagement model to derive a meaning from the input communication; gathering information from the patient via the user interface, the information related to the derived meaning of the input communication; accessing health data associated with the patient; generating a suggested care path using a stored care model based on the gathered information and the health data; and outputting the suggested care path to the patient via the user interface.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying figures, which are incorporated herein and form part of the specification, illustrate integrated patient acquisition for virtual care. Together with the description, the figures further serve to explain the principles of the integrated patient acquisition for virtual care described herein and thereby enable a person skilled in the pertinent art to make and use the integrated patient acquisition for virtual care.

DETAILED DESCRIPTION

Reference will now be made in detail to embodiments of the integrated patient acquisition for virtual care with reference to the accompanying figures.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

According to principles described herein, qualified medical data and guidance is used to train an interactive interface or "chatbot" that can be integrated into a website, a mobile application, a smartphone voice application, or other user-facing interface. Using the user-facing interface, a patient interacts with the trained chatbot if they need medical care. Through the interaction, and using underlying data from any of various sources, the chatbot guides the patient towards an appropriate type of care (e.g., seek emergency treatment or schedule a further appointment with a healthcare provider).

If the care indicated requires interaction with a caregiver (e.g., medical provider, care manager, etc.), the chatbot gathers information about the patient (e.g., demographics, existing provider, and insurance information) and uses that information in conjunction with underlying algorithms to match the patient to a care provider and care modality, including virtual care options, such as telemedicine and online treatment guidance.

If the patient opts to continue, the chatbot is configured to enable a care encounter to be scheduled, either via a programmatic transaction or by the chatbot calling the selected provider to make an appointment.

Figure 1:
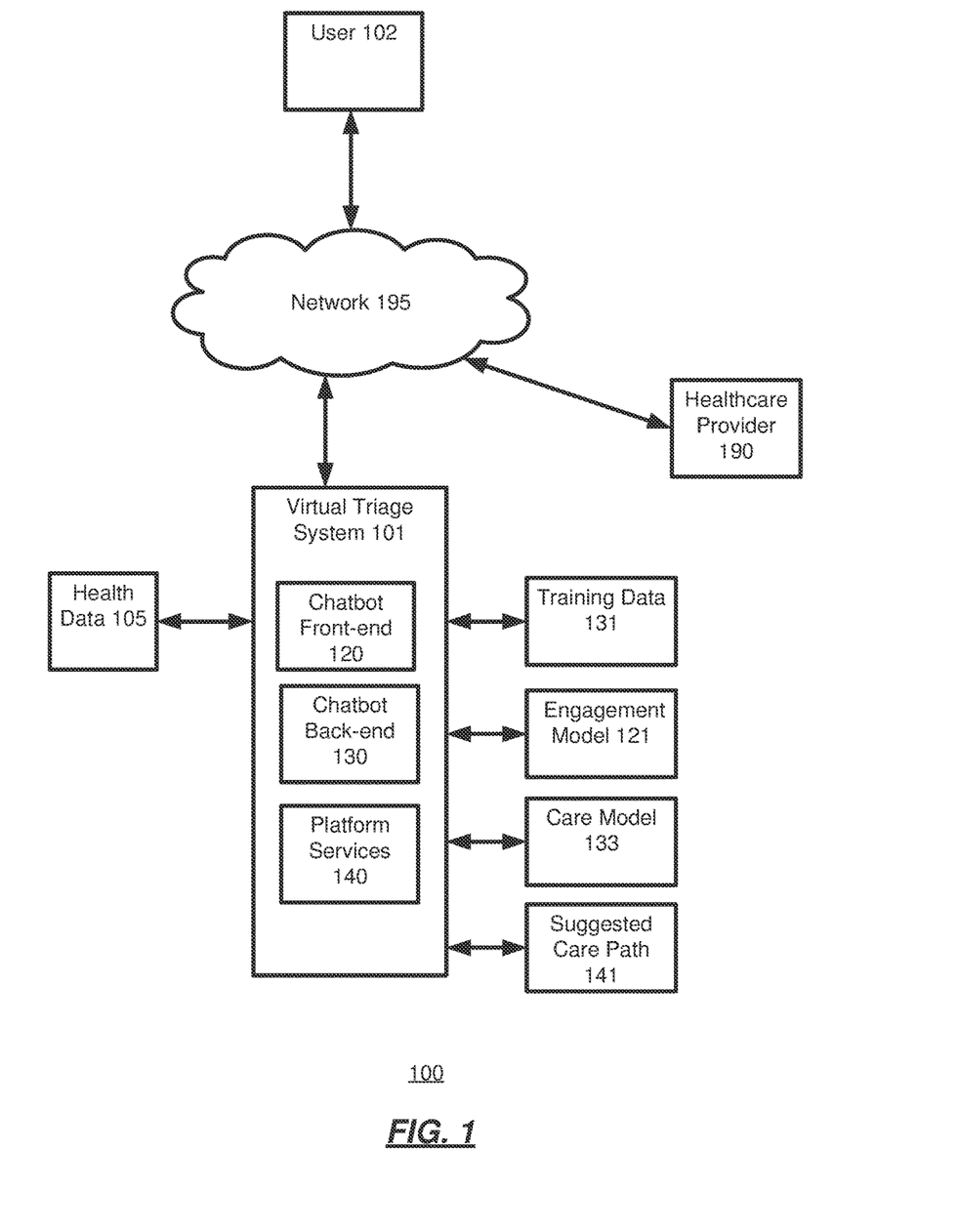
FIG. 1 is an illustration of environment 100 for providing virtual triage services to patients.

FIG. 1 is an illustration of environment 100 for providing virtual triage services to patients. As shown, the environment 100 includes a virtual triage system 101 in communication with one or more users 102 and healthcare providers 190 through a network 195 (e.g., the internet). The user 102 (also referred to herein as the patient) may be an individual who is seeking medical care or is currently experiencing one or more symptoms. The healthcare provider 190 (also referred to herein as medical provider or provider) is any provider of healthcare or medical services and may include doctors, nurses, and other medical practitioners. Healthcare providers 190 may include individual practitioners as well as clinics, groups, hospitals, and any other entities that provide healthcare or medical services to users 102. While only one user 102 and one healthcare provider 190 are shown, it is for illustrative purposes only; more or fewer healthcare providers 190 and users 102 may be supported.

In order to provide virtual care to the users 102, the environment 100 may further include a virtual triage system 101. As an overview, the virtual triage system 101 may provide a chatbot (also referred to herein as chatbot service or voicebot service) that users 102 may access via computer, API, or telephone. The chatbot may use natural language processing ("NPL") and an artificial intelligence based engagment model 121 to interact with the user 102 via a voice or text-based interface.

The chatbot may converse with the user 102 and may gather information from the user 102 using a structured health and physical assessment of the user 102. The structured health and physical assessment may be a series of questions that may be dynamically generated or selected based on the information provided by the user 102 to the chatbot and other health information known about the user 102. The questions may include questions about the overall health of the user 102 including any symptoms that they may be experiencing.

Based on the structured health and physical assessment, the health data, and other information, the chatbot may triage the user 102 and may determine and convey a suggested care path 141 for the user 102. For example, the chatbot may tell the user 120 to go to the hospital or may suggest that the user 102 make an appointment with a healthcare provider 190. As will be described further below, the chatbot may further select a healthcare provider 190 based on patient preferences and provider availability and may even schedule an appointment with a selected healthcare provider 190 for the user 102.

As illustrated, the virtual healthcare system 101 may include several components including, but not limited to, a chatbot front-end 120, a chatbot back-end 130, and platform services 140. More or fewer components may be supported. Depending on the embodiment, some or all of the components of the virtual triage system 101 may be implemented together or separately by one or more general purpose computing devices such as the computing device 500 illustrated with respect to FIG. 5.

The chatbot front-end 120 may provide the chatbot or interface through which the virtual triage system 101 interacts with the user 102. In one embodiment, the chatbot may be part of a webpage or portal that that the user 102 may access using their personal computer or smartphone. In another embodiment, the chatbot may be implemented using an "app" or application that the user 102 downloads to their smartphone or personal computer.

The chatbot front end 120 may also provide a voice interface or voicebot through which the virtual triage system 101 interacts with the user via their voice. For example, the virtual triage system 101 may provide a telephone number through which a user 102 may contact the chatbot front-end 120.

The chatbot front-end 120 may interact with a user 102 using an engagement model 121. The engagement model 121 may be an artificial intelligence or machine learning model that is trained to interact with a user 102 using natural language and to derive meaning from the interaction with the user. In addition, the engagement model 121 may be trained to generate one or more questions for a user 102, to receive user input in response to the questions, and to generate one or more follow-up questions.

Alternatively, or additionally, the chatbot front-end 120 may interact with the user 102 using a script that defines a series of questions that the chatbot front-end 120 may ask the user 102. The script may include various "branches" that the chatbot front-end 120 may follow depending on the answers that are received from the user 102.

In some embodiments, the engagement model 121 may be trained by the platform services 140 using training data 131. The training data 131 may include data such as transcripts from previous user 102 and agent interactions, as well as one or more medical or healthcare related dictionaries or knowledge bases. The training data 131 may have been labeled or annotated by one or more reviewers. The reviewers may include medical practitioners (e.g., doctors).

The chatbot front-end 120, using either a model 121 or a script, may collect a variety of information about the user 102. Initially, the chatbot front-end 120 may collect information that may be used to authenticate or determine the identity of the user 102. This information may include the name of the user 102, a username associated with the user 102, a phone number or email address associated with the user 102, and insurance information associated with the user 102.

The chatbot front-end 120 may further collect information regarding any symptoms or medical conditions that the user 102 may be experiencing. Depending on the embodiment, using either a model 121 or a script, the chatbot may conduct what is referred to as a structured health and physical assessment of the user 102. The assessment may include a series of questions that are meant to determine the symptoms or medical conditions that may be associated with the user 102.

The chatbot back-end 130 may receive the information collected by the chatbot front-end 120 during the chat with the user 102 and may perform one or more actions based on the collected information. The chatbot back-end 130 may initially authenticate or determine the identity of the user 102. The chatbot back-end 130 may authenticate the user 101 using the information provided by the user (e.g., name or telephone number) along with other information that is known about the user 102. This may include an IP address or phone number that was used by the user 102 to access the virtual triage system 101, or a MAC address associated with a computing device that is used by the user 102 to access the virtual triage system 101.

The chatbot back-end 130 may further receive health data 105 associated with the user 102 (if any). The health data 105 may include health related information about the user 102 including their medical history, age, general health, known medications, and healthcare providers 190 that the user 102 has seen or is currently seeing. Other information may be included in the health data 105. In some embodiments, the health data 105 may be received as healthcare data cloud (HDC) object data. Depending on the embodiment, some or all of the health data 105 may be confirmed by the user 102 using the chatbot or may be requested from the user by the chatbot.

The chatbot back-end 130 may determine a suggested care path 141 for the user 102 based on the information received from the chatbot front-end 120 and the health data 105. As used herein, the suggested care path 141 may be a recommendation as to the next steps that the user 102 should take. Example paths 141 may include recommendations to make an appointment with a healthcare provider 190, recommendations to wait some amount of time to see if the symptoms clear-up or persist, and recommendations to go to the emergency room or an urgent care facility. Once determined, the chatbot front-end 120 may provide the suggested care path 141 to the user 102 via the chatbot interface.

In some embodiments, the chatbot back-end 130 may determine the suggested care path 141 using a care model 133. The care model 133 may be an artificial intelligence or machine learning-based model that takes as an input the information provided by the user 102 to the chatbot, and optionally the health data 105 associated with the user 102, and outputs one or more suggested care paths 141. Depending on the embodiment, the interaction model 133 may have been trained by the platform services 140 using the training data 131.

In some embodiments, if the suggested care path 141 is to visit a health practitioner 190, the chatbot back-end 130 may select one or more health practitioners 190 for the user 102 to visit. The chatbot back-end 130 may select the healthcare practitioners 190 based on a variety of information including the type of healthcare provider 190 that the user 102 should visit (e.g., should the user 102 see a specialist or generalist), how urgent is the care path 141 (e.g., does the user 102 need to see a provider in the next few days or can the user 102 wait a week or a month?), preferences of the user 102 (e.g., does the user have a current doctor, or does the user prefer a particular practice or hospital system?), and the location of the user 102 (e.g., the chatbot back-end 130 may prefer healthcare providers 190 that are geographically close to the user 102), and is the user 102 willing to see healthcare providers 190 via telemedicine.

In some embodiments, the chatbot back-end 130 may select the healthcare providers 190 using a provider matching service provided by the platform services 140. For example, the platform services 140 may be a service that takes as an input criteria such as provider specialty, provider location, etc., and outputs a list of suitable healthcare providers 190. Other information may be considered such as the types of insurance accepted by the healthcare providers 190.

The chatbot front-end 120 may present the selected healthcare providers 190 to the user 102 in the chatbot interface. The user 102 may then select one or more preferred healthcare providers 190 from among those presented.

The chatbot back-end 130 may receive the selected healthcare providers 190 and may use a scheduling service provided by the platform service 140 to determine the available appointments of each healthcare provider 190 over a selected time period (e.g., next day, week, month, etc.). The chatbot front-end 120 may present the availability of each selected healthcare provider 190 to the user 102 in the chatbot interface. The user 102 may then select an appointment from those presented.

The chatbot back-end 130 may schedule the user 102 with the selected appointment with the selected healthcare provider 190. In some embodiments, the chatbot back-end 130 may schedule the appointment using an appointment scheduling service provided by the perform services 140. For example, the platform services 140 may inject or insert the appointment with the user 102 into the schedule associated with the selected healthcare provider 190.

Figure 2A:
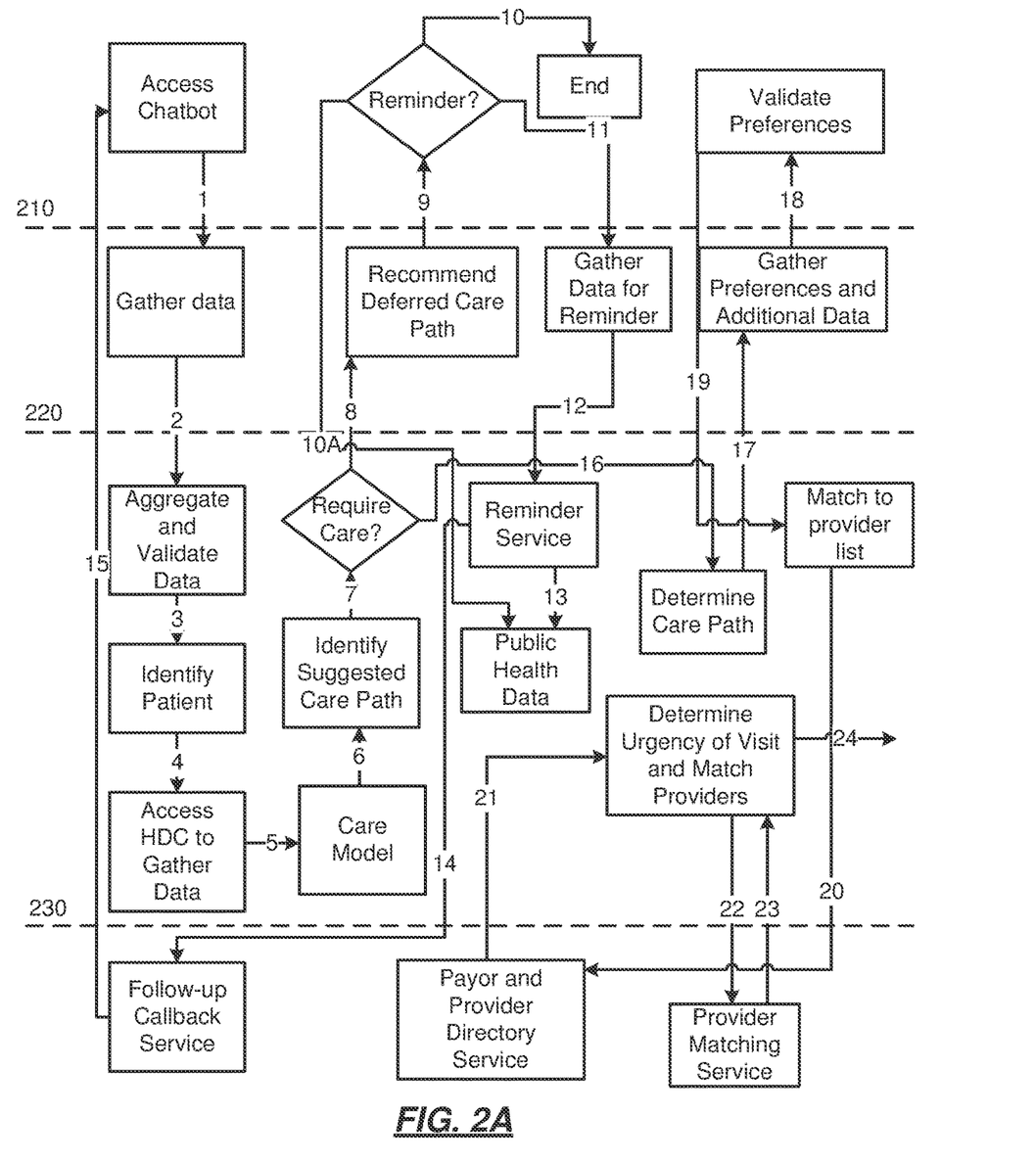
FIG. 2A is a flow diagram of steps of a method according to principles described herein.
Figure 2B:
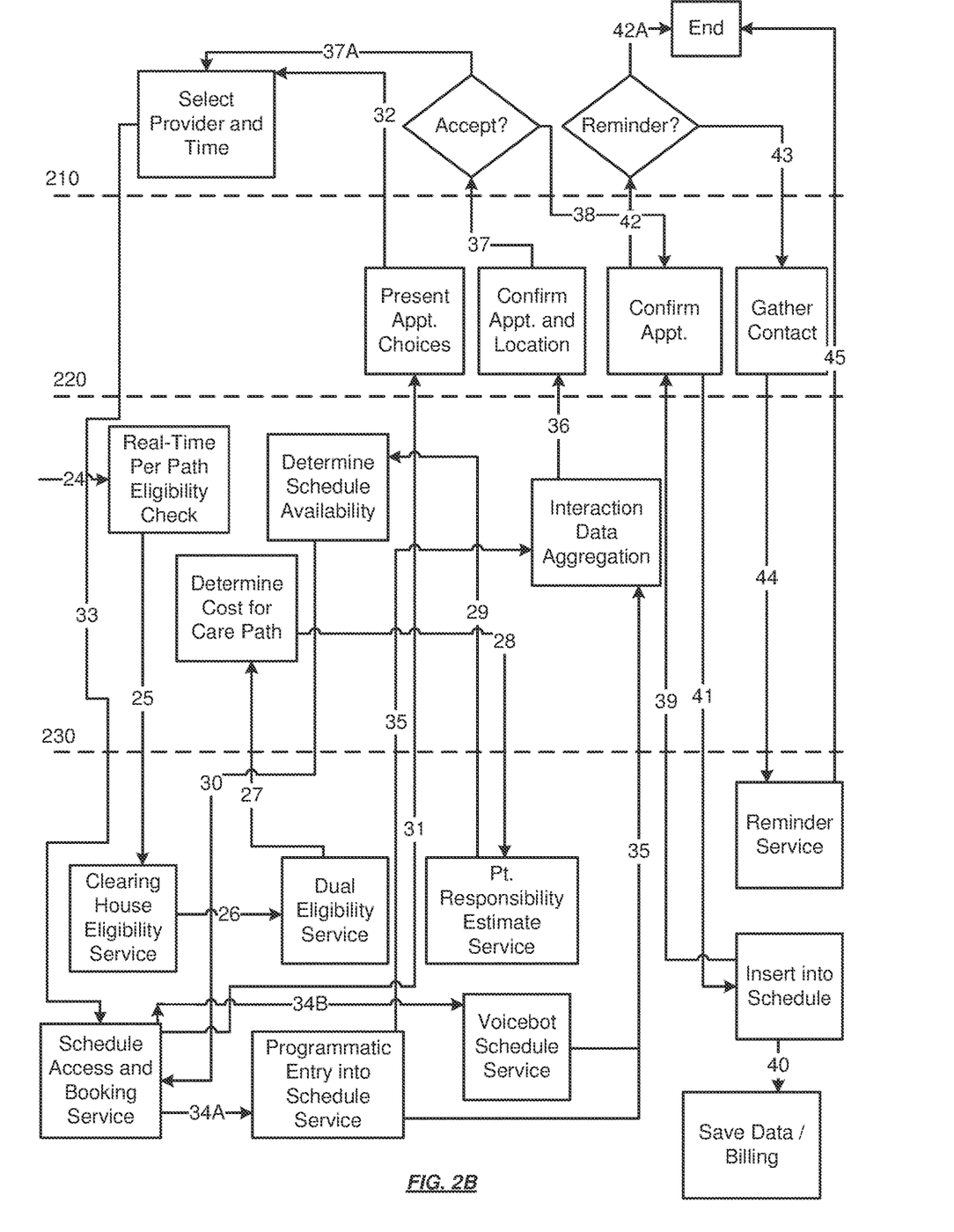
FIG. 2B is an extension of the flow diagram FIG. 2A and shows additional steps of the method according to principles described herein.

Referring to FIGS. 2A and 2B, a method 200 for communicating with a patient (e.g., user 102) and the virtual triage system 101 is described. Note that in the FIGS. 2A and 2B actions or functions that are performed by the user 102 are shown as above the line 210, actions or functions that are performed by the chatbot front-end 120 are shown between the line 210 and the line 220, actions or functions that are performed by the chatbot back-end 130 are shown between the line 220 and the line 230, and actions or functions that are performed by the platform services 140.

Beginning in FIG. 2A, the chatbot may interact with the patient via the chatbot front-end 120 to gather data/structured health and physical assessment data about the patient (step 1). The information may be gathered from the patient using any appropriate chatbot interface, including forms, voice, or text interaction. The collected information may include the name of the patient, demographics information about the patient, and a natural language description of the symptoms or medical issues currently being experienced by the patient, and information that may be used to verify or validate the patient (e.g., passwords and answer to security questions). The chatbot may gather the information by asking the patient a series of questions. The chatbot-front end 120 may pass the gathered data to the chatbot-back end 130 (step 2).

The chatbot back-end 130 may receive the gathered data and may aggregate and validate the data (step 3). After validating the data from the patient, the chatbot back-end 130 may access systems (e.g., an enterprise identity service) to identify the patient using the validated data (step 4). The identification and verification of the patient then allows the chatbot back-end 130 to interact with external and/or internal systems to gather data about the patient that is relevant to the path 141 determination, and the chatbot back-end 130 may provide the gathered data to the care model 133.

In some embodiments, the external and/or internal systems may include the records of the healthcare system hosting the chatbot, records of other healthcare systems, any electronic medical records associated with the patient, prior contact logs with the chatbot and other related information, historical patient providers, specialty practitioners, etc. The care model 133 may use this gathered information along with the information provided by the patient during the chatbot session to generate or identify the suggested care path 141 (step 6).

The method 200 may diverge depending on whether the suggested care path 141 requires care by a healthcare provider 190 (step 7). If the care path 141 does not require a healthcare provider 190, then then the chatbot front-end 120 may recommend to the patient a deferred care path 141 that does not require a healthcare provider 190 (step 8). The chatbot front-end 120 may ask the patient if they would like a follow up reminder sometime in the future (step 9). For example, the chatbot may offer to check in with the patient in one week to see if their symptoms have improved. If the patient refuses the reminder, the chatbot front-end 120 may exit (step 10), and the chatbot back-end 130 may save some information about the patient interaction for public health surveillance (step 10A). For example, if the symptoms reported by the patient to the chatbot are possibly COVID-19 or influenza, the data may be recorded for reporting to public health services or may be held for further symptoms or diagnosis information to confirm the illness and report to the public health service. Another example scenario could be symptoms that may be indicative of an infection, that when looked at retroactively may implicate food poisoning or other public health consideration that may be reported and traced.

If the patient accepts the reminder request, then the chatbot front-end 120 may gather contact information about the patient for the reminder (step 11). The contact information may include an email address or phone number of the patient. The contact information and reminder may be added to a reminder service by the chatbot back-end 130 (step 12) and the chatbot back-end 130 may save some information about the user interaction for public health surveillance (step 13).

If the suggested care path 141 includes a referral to a healthcare provider 190, the virtual triage system 101 may then move into a mode of coordinating care (step 16). In particular, the chatbot front-end 120 may gather additional information about the patient (e.g., health data 105) such as provider primary and secondary preferences, time/date of appointment preferences, appointment type (telemedicine, in person, etc.), preferred distance for a provider, demographics preferences, primary and secondary insurance carriers, and proof of insurance (step 17). The chatbot front-end 120 may ask the patient to validate the additional information, or to provide the additional information if such information is not already known to the virtual triage system 101 (step 18).

The virtual health system 101 may then proceed to match the patient condition, insurance, and preferences to a list of providers (step 19) and may check the providers against a payer provider directory service to find/confirm that the provider is in network for the patient's insurance (step 20).

The virtual health system 101 may also determine urgency of the need for a healthcare provider visit and may match with a provider with appropriate availability (step 21). The virtual health system 101 may interact with a provider matching service that matches the patient with an appropriate provider with appropriate availability (step 22). For example, if the issue is not urgent, then the provider matching service may match the patient with an appointment with the provider of his/her choice even if that appointment is not the first available appointment with a provider of the appropriate specialty. However, if the need is urgent, then the provider matching service may match the patient with the first available appointment with a provider of the necessary specialty, even if that provider does not match other preferences of the patient (e.g., distance, demographics, etc.). The provider matching service may refer back to the training data 131 in determining the urgency of the visit and the necessity of a good provider match. After accessing the provider matching service, the virtual triage system 101 may obtain potential matches (step 23).

Continuing to FIG. 2B, the virtual triage system 101 may conduct a check of the eligibility of the patient to be cared for by each matched provider (step 24). Such eligibility check may be performed in real-time and may be conducted by accessing external services such as a clearinghouse eligibility service (step 25) and/or a dual eligibility service (step 26).

The virtual triage system 101 may also determine a cost for each suggested care plan/treatment visit (step 27). The virtual triage system 101 may further estimate the payment responsibility of the patient by accessing a patient responsibility estimate service (step 28).

After eligibility is confirmed, the virtual triage system 101 may proceed to determine the schedule availability of the selected provider(s) (step 29) by accessing scheduling and booking services for the selected provider(s) (step 30). In one path of the method 200, the chatbot front-end 120 may present options for the appointment, including the provider 190, time/date, cost, etc. to the patient (step 31). In this path, the patient may then select a provider 190 and appointment time (step 32), which the virtual triage system 101 may confirm with the scheduling and booking service (step 33).

In another path of the method 200, the virtual triage system 101 may provide a programmatic entry into the providers scheduling service directly, without necessarily offering the choice to the patient (step 34A). In some embodiments, the system 101 may actually use the engagement model 121 to contact a provider's office such that a voicebot actually makes contact and interacts with the provider's scheduler to schedule the appointment (step 34B).

Regardless of how the appointment is scheduled, data regarding the appointment may be aggregated (step 35) and may be provided to the patient via the chatbot front-end 120 to confirm the appointment time and location (step 36). The patient may accept or reject the appointment (step 37). If the patient rejects the appointment (step 37A), then the virtual triage system 101 may return to step 32 and a new provider and appointment may be selected.

If the patient accepts the appointment, the appointment may be confirmed by the patient (step 38), may be inserted into the provider schedule (step 39), and may be stored by the virtual triage system 101 (step 40). After the appointment is confirmed and inserted into the provider's schedule, the virtual triage system 101 may determine if the provider desires a reminder of the appointment (step 42). If no reminder is requested/needed, interaction between the virtual triage system 101 and the patent may end (step 42A). Otherwise, the virtual triage system 101 may gather information for the reminder (step 43) and that information may be provided to a reminder service (step 44), and at that point interaction between the virtual triage system 101 and the patient may end (step 45).

Figure 3:
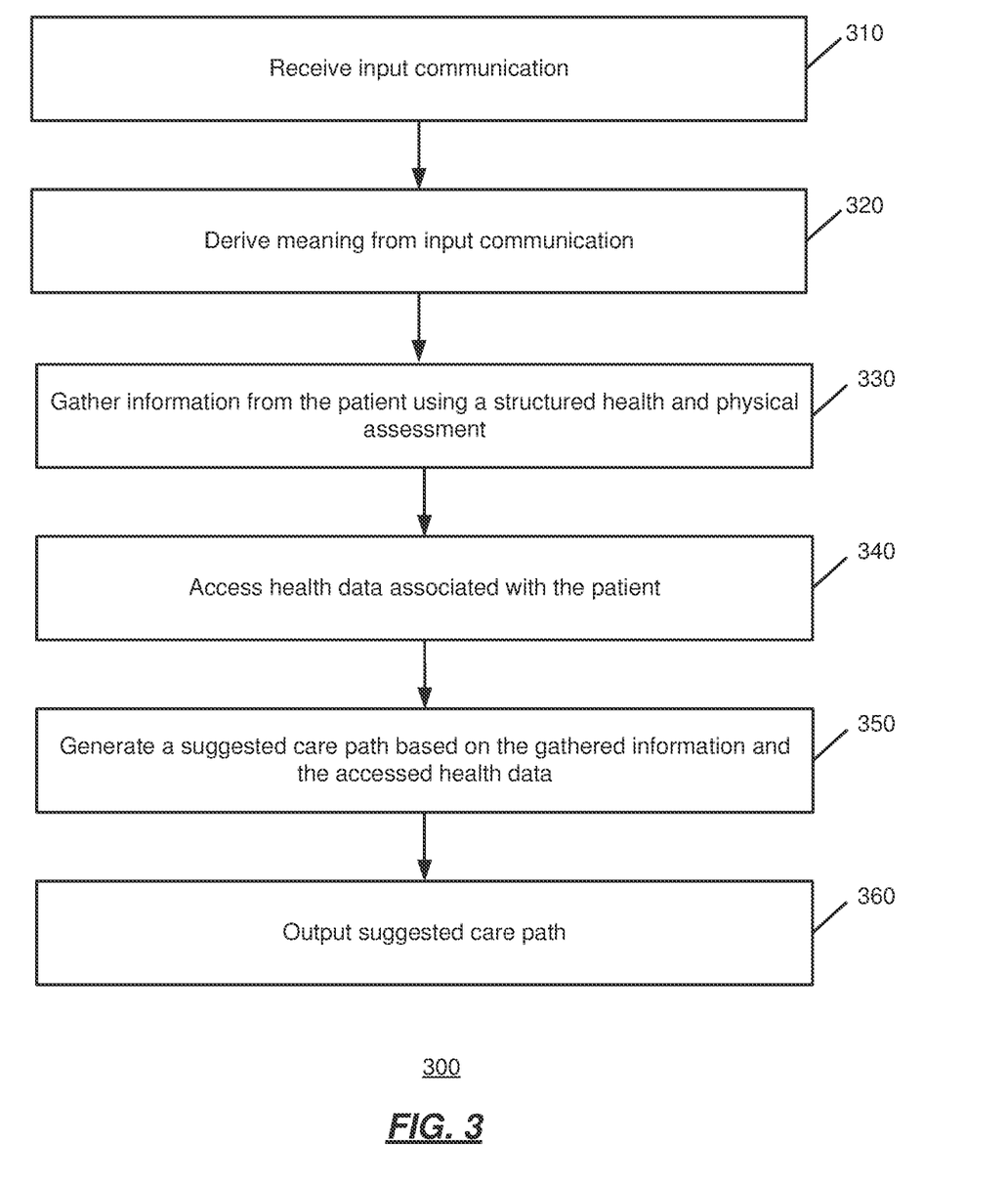
FIG. 3 is an illustration of a method for outputting a suggested care path.

FIG. 3 is an illustration of a method 300 for outputting a suggested care path 141. The method 300 may be implemented by the virtual triage system 101.

At 310, input communication is received. The input communication may be received by the chatbot front-end 120 from a patient (i.e., the user 102) through a chat interface provided by the chatbot front-end 120. The input communication may be a request to receive care from the virtual triage system 101. The input communication may be a natural language communication.

At 320, meaning is derived from the input communication. The meaning may be derived from the input communication by the chatbot front-end 120 using an engagement model 121. In some embodiments, the chatbot front-end 120 may use the model 121 to parse the input communication to determine information about the patient such as their name and address, and to determine a reason that the patient is contacting the virtual triage system 101.

For example, the patient may provide an input communication such as "My name is Fred Rodgers and I have a headache." The chatbot front-end 120 may parse the communication to determine the meaning that the patient's name is Fred Rodgers and they are calling about a headache.

At 330, information is gathered from the patient using a structured health and physical assessment. The information may be gathered by the chatbot front-end 120. In some embodiments, the chatbot front-end 120 may gather the information by asking one or more questions as part of the structured health and physical assessment. The questions may be part of a script or may be generated using the engagement model 121.

Continuing the example above, the chatbot front-end 120 may ask a series of questions related to "headaches." The questions may include questions about where in the head the patient feels the pain, how long they have had the headache, how much pain they are in, and questions about any other related symptoms such as nausea or breathing problems.

At 340, health data associated with the patient is accessed. The health data 105 may be accessed by the chatbot back-end 130. The health data 105 may include a medical history of the patient, current medications taken by the patient, and one or more healthcare providers 190 associated with the patient. Depending on the embodiment, the health data 105 for a patient may be HDC object data.

At 350, a suggested care path is generated. The suggested care path 141 may be generated by the chatbot back-end 130 using the gathered information, the health data 105, and a stored care model 133. The care model 133 may have been trained by the platform services 140 using training data 131 such as physician reviewed data related to symptoms and diagnoses, and medical data from one or more knowledge bases. The suggested care path 141 may include urgent care paths (e.g., go to hospital) and deferred care paths (e.g., see a doctor in the future, or see a doctor if symptoms worsen).

At 360, the suggested care path is output. The suggested care path 141 may be output by the chatbot front-end 120 via the chatbot interface. Depending on the suggested care path 141, the patient may then take further actions such as scheduling an appointment with a healthcare provider 190 via the chatbot.

Figure 4:
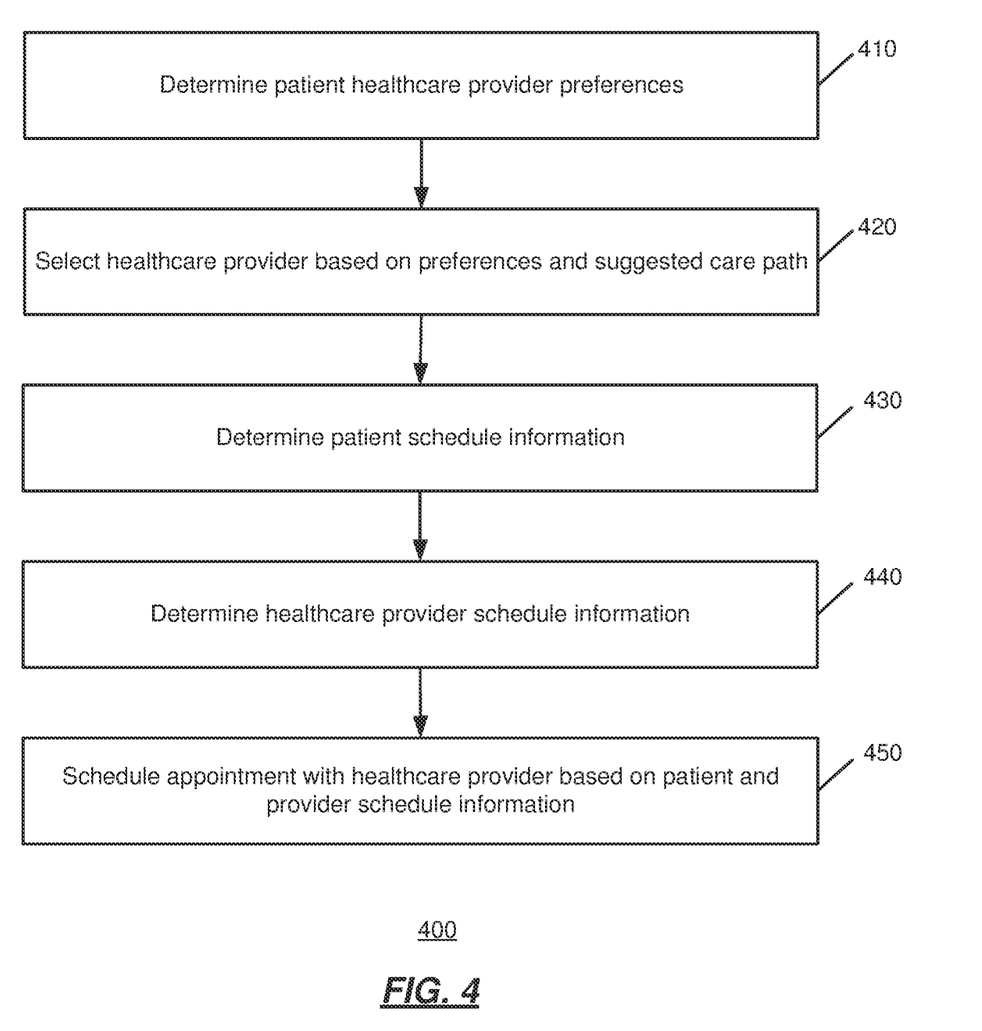
FIG. 4 is an illustration of a method for scheduling an appointment with a healthcare provider.

FIG. 4 is an illustration of a method 400 for scheduling an appointment with a healthcare provider 190. The method 400 may be implemented by a virtual triage system 101.

At 410, patient healthcare provider preferences are determined. The patient healthcare provider preferences may be determined by the chatbot back-end 130 or the chatbot front-end 120. For example, in one embodiment, the chatbot front-end 120 may ask the patient if they have a preferred healthcare provider 190 that they would like to see or a particular medical clinic or hospital system that they would like to use. In another embodiment, the chatbot back-end 130 may determine if the patient has any associated or preferred healthcare providers 190 in their health data 105.

At 420, a healthcare provider is selected. The healthcare provider 190 may be select by the chatbot back-end 130 using the patient preferences and the suggested care path 141. For example, if the suggested care path 141 is to see a dermatologist the chatbot back-end 130 may select a provider 190 that is a dermatologist that matches or does not conflict with the patient preferences, if possible. Depending on the embodiment, the chatbot back-end 130 may select multiple healthcare providers 190.

At 430, patient schedule information is determined. The patient schedule information may be determined by the chatbot front-end 120. For example, the chatbot front-end 120 may ask the patient to indicate their availability over the next few days or weeks via the chatbot interface. Alternatively or additionally the chatbot back-end 130 may interface with a scheduling application associated with the user (e.g., Google™ calendar or Microsoft Outlook™) to determine the patient schedule information. In some embodiments, no schedule information from the patient may be initially determined or considered.

At 440, healthcare provider 190 schedule information is determined. The schedule information of the selected healthcare provider 190 may be determined by the chatbot back-end 130 using one or more platform services 140. For example, there may be a platform service 140 that queries the schedules of one or more healthcare providers 190 to determine availability.

At 450, an appointment is scheduled with a healthcare provider based on the patient and provider schedule information. The appointment may be scheduled by the chatbot back-end 130 using one or more platform services 140. For example, there may a platform service 140 that directly connects to the scheduling applications used by the healthcare providers 190. Depending on the embodiment, the chatbot front-end 120 may display available times for selected healthcare providers 190, and the patient may select the time and provider 190 from among the displayed times and/or providers 190.

Figure 5:
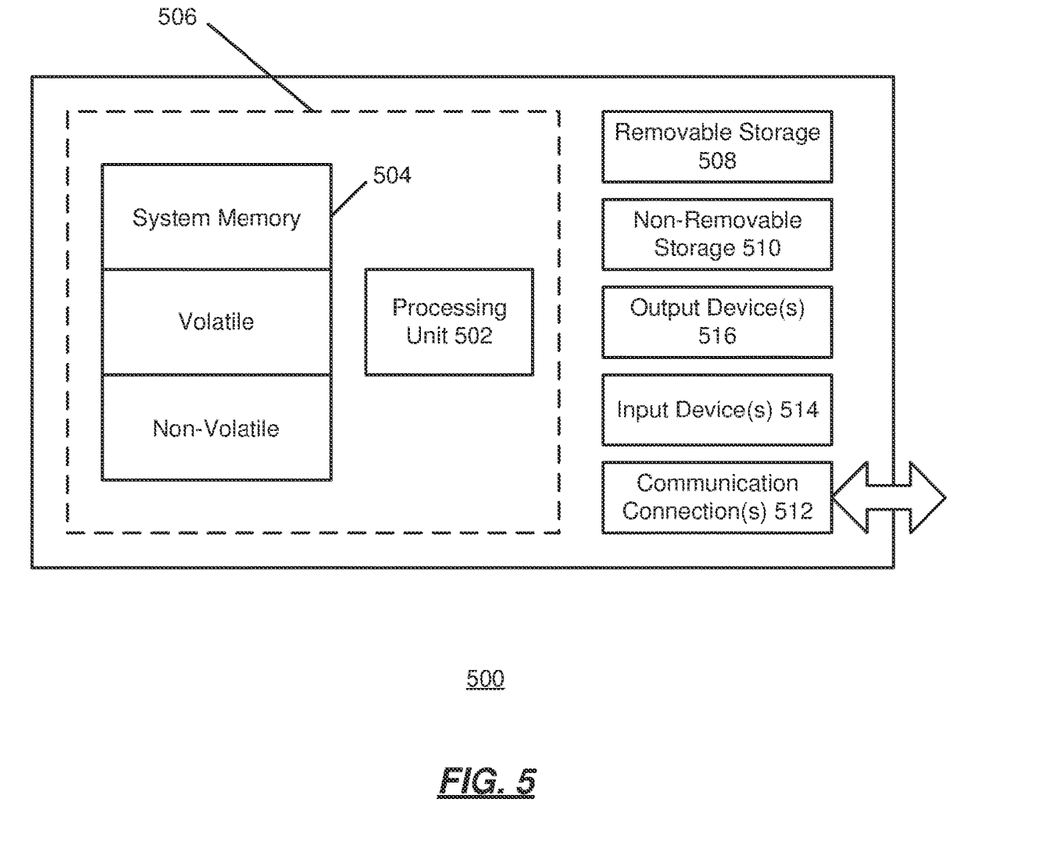
FIG. 5 shows an exemplary computing environment in which example embodiments and aspects may be implemented.

FIG. 5 shows an exemplary computing environment in which example embodiments and aspects may be implemented. The computing device environment is only one example of a suitable computing environment and is not intended to suggest any limitation as to the scope of use or functionality.

Numerous other general purpose or special purpose computing devices environments or configurations may be used. Examples of well-known computing devices, environments, and/or configurations that may be suitable for use include, but are not limited to, personal computers, server computers, handheld or laptop devices, multiprocessor systems, microprocessor-based systems, network personal computers (PCs), minicomputers, mainframe computers, embedded systems, distributed computing environments that include any of the above systems or devices, and the like.

Computer-executable instructions, such as program modules, being executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 5, an exemplary system for implementing aspects described herein includes a computing device, such as computing device 500. In its most basic configuration, computing device 500 typically includes at least one processing unit 502 and memory 504. Depending on the exact configuration and type of computing device, memory 504 may be volatile (such as random access memory (RAM)), non-volatile (such as read-only memory (ROM), flash memory, etc.), or some combination of the two. This most basic configuration is illustrated in FIG. 5 by dashed line 506.

Computing device 500 may have additional features/functionality. For example, computing device 500 may include additional storage (removable and/or non-removable) including, but not limited to, magnetic or optical disks or tape. Such additional storage is illustrated in FIG. 5 by removable storage 508 and non-removable storage 510.

Computing device 500 typically includes a variety of computer readable media. Computer readable media can be any available media that can be accessed by the device 500 and includes both volatile and non-volatile media, removable and non-removable media.

Computer storage media include volatile and non-volatile, and removable and non-removable media implemented in any method or technology for storage of information such as computer readable instructions, data structures, program modules or other data. Memory 504, removable storage 508, and non-removable storage 510 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer storage media may be part of computing device 500.

Computing device 500 may contain communication connection(s) 512 that allow the device to communicate with other devices. Computing device 500 may also have input device(s) 514 such as a keyboard, mouse, pen, voice input device, touch input device, etc. Output device(s) 516 such as a display, speakers, printer, etc. may also be included. All these devices are well known in the art and need not be discussed at length here.

It should be understood that the various techniques described herein may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

As used herein, the singular form "a," "an," and "the" include plural references unless the context clearly dictates otherwise. As used herein, the terms "can," "may," "optionally," "can optionally," and "may optionally" are used interchangeably and are meant to include cases in which the condition occurs as well as cases in which the condition does not occur.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, and handheld devices, for example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method comprising:
   parsing, by one or more processors and via a chatbot front-end of a virtual triage system that interfaces with a user, a natural language input using a first machine learning model that is trained with transcripts from historical interactions between agents and users and with medical knowledge bases to derive a parsed natural language input;
   determining, by the one or more processors and via a chatbot back-end of the virtual triage system that (1) is communicatively coupled to the chatbot front-end and (2) receives the parsed natural language input, that the user is authenticated for access to the virtual triage system based on the parsed natural language input and at least one of an Internet Protocol (IP) address, a phone number, or a media access control (MAC) address associated with a computing device used by the user to access the virtual triage system;
   accessing, by the one or more processors and via the chatbot back-end and in response to determining that the user is authenticated, historical health data associated with the user, wherein the historical health data includes a medical history of the user and identifiers of medications taken by the user;
   generating, by the one or more processors and via the chatbot back-end based on inputting the parsed natural language input and the historical health data into a second machine learning model that is trained with the medical knowledge bases, a recommendation for the user;
   controlling, by the one or more processors and via the chatbot back-end, a type of additional information to be collected from the user by the chatbot front-end based on a type of the recommendation; and
   providing, by the one or more processors and based on the recommendation, a programmatic entry directly to a scheduling service of a healthcare provider,
   wherein the first machine learning model and the second machine learning model are trained by a common service of the virtual triage system.

2. The computer-implemented method of claim 1, wherein the type of the recommendation comprises a deferred care path or an urgent care path.

3. The computer-implemented method of claim 1, wherein the recommendation comprises advising the user to seek care via the healthcare provider.

4. The computer-implemented method of claim 1, further comprising selecting, by the one or more processors, the healthcare provider based on the parsed natural language input and the historical health data.

5. The computer-implemented method of claim 1, further comprising:
determining, by the one or more processors, available appointment times with the healthcare provider;
presenting, by the one or more processors, one or more available appointment times, of the available appointment times via the chatbot front-end;
receiving, by the one or more processors, a selected appointment time of the one or more available appointment times presented via the chatbot front-end; and
scheduling, by the one or more processors and using the scheduling service, the selected appointment time with the healthcare provider for the user.

6. The computer-implemented method of claim 1, further comprising selecting, by the one or more processors, the healthcare provider based on patient healthcare provider preferences of the user and the recommendation.

7. The computer-implemented method of claim 1, further comprising training, by the one or more processors, the first machine learning model and the second machine learning model using physician reviewed training data.

8. The computer-implemented method of claim 1, further comprising conducting, by the one or more processors, a structured health and physical assessment of the user; and generating, by the chatbot back-end based on applying the-second machine learning model to (a) the parsed natural language input, (b) the structured health and physical assessment, and (c) the historical health data, the recommendation for the user.

9. A system comprising:
one or more processors; and
one or more memories storing processor-executable instructions that, when executed by the one or more processors, cause the one or more processors to perform operations comprising:
parsing, via a chatbot front-end of a virtual triage system that interfaces with a user, a natural language input using a first machine learning model that is trained with transcripts from historical interactions between agents and users and with medical knowledge bases to derive a parsed natural language input;
determining, via a chatbot back-end of the virtual triage system that (1) is communicatively coupled to the chatbot front-end and (2) receives the parsed natural language input, that the user is authenticated for access to the virtual triage system based on the parsed natural language input and at least one of an Internet Protocol (IP) address, a phone number, or a media access control (MAC) address associated with a computing device used by the user to access the virtual triage system;
accessing, via the chatbot back-end and in response to determining that the user is authenticated, historical health data associated with the user, wherein the historical health data includes a medical history of the user and identifiers of medications taken by the user;
generating, via the chatbot back-end based on inputting the parsed natural language input and the historical health data into a second machine learning model that is trained with the medical knowledge bases, a recommendation for the user;
controlling, via the chatbot back-end, a type of additional information to be collected from the user by the chatbot front-end based on a type of the recommendation; and
providing, based on the recommendation, a programmatic entry directly to a scheduling service of a healthcare provider,
wherein the first machine learning model and the second machine learning model are trained by a common service of the virtual triage system.

10. The system of claim 9, wherein the type of the recommendation comprises a deferred care path or an urgent care path.

11. The system of claim 9, wherein the recommendation comprises advising the user to seek care via the healthcare provider.

12. The system of claim 9, further comprising processor-executable instructions that, when executed by the one or more processors, cause the one or more processors to perform operations comprising: selecting the healthcare provider based on the parsed natural language input and the historical health data.

13. The system of claim 9, further comprising processor-executable instructions that when executed by the one or more processors cause the one or more processors to perform operations comprising:
determining available appointment times with the healthcare provider;
presenting one or more available appointment times, of the available appointment times via the chatbot front-end;
receiving a selected appointment time of the one or more available appointment times presented via the chatbot front-end; and
scheduling, using the scheduling service, the selected appointment time with the healthcare provider for the user.

14. The system of claim 9, further comprising processor-executable instructions that, when executed by the one or more processors, cause the one or more processors to perform operations comprising: selecting the healthcare provider based on patient healthcare provider preferences of the user and the recommendation.

15. The system of claim 9, further comprising processor-executable instructions that, when executed by the one or more processors, cause the one or more processors to perform operations comprising: training the first machine learning model and the second machine learning model using physician reviewed training data.

16. The system of claim 9, further comprising processor-executable instructions that, when executed by the one or more processors, cause the one or more processors to perform operations comprising:
conducting a structured health and physical assessment of the user; and generating, by the chatbot back-end based on applying the second machine learning model to (a) the parsed natural language input, (b) the structured health and physical assessment, and (c) the historical health data, the recommendation for the user.

17. One or more non-transitory computer-readable media storing processor-executable instructions that, when executed by one or more processors, cause the one or more processors to perform operations comprising:
parsing, via a chatbot front-end of a virtual triage system that interfaces with a user, a natural language input using a first machine learning model that is trained with transcripts from historical interactions between agents and users and with medical knowledge bases to derive a parsed natural language input;
determining, via a chatbot back-end of the virtual triage system that (1) is communicatively coupled to the chatbot front-end and (2) receives the parsed natural language input, that the user is authenticated for access to the virtual triage system based on the parsed natural language input and at least one of an Internet Protocol (IP) address, a phone number, or a media access control (MAC) address associated with a computing device used by the user to access the virtual triage system;

accessing, via the chatbot back-end and in response to determining that the user is authenticated, historical health data associated with the user, wherein the historical health data includes a medical history of the user and identifiers of medications taken by the user;

generating, via the chatbot back-end based on inputting the parsed natural language input and the historical health data into a second machine learning model that is trained with the medical knowledge bases, a recommendation for the user;

controlling, via the chatbot back-end, a type of additional information to be collected from the user by the chatbot front-end based on a type of the recommendation; and providing, based on the recommendation, a programmatic entry directly to a scheduling service of a healthcare provider, wherein the first machine learning model and the second machine learning model are trained by a common service of the virtual triage system.

* * * * *